(12) United States Patent
Tuzel et al.

(10) Patent No.: US 9,633,274 B2
(45) Date of Patent: Apr. 25, 2017

(54) METHOD AND SYSTEM FOR DENOISING IMAGES USING DEEP GAUSSIAN CONDITIONAL RANDOM FIELD NETWORK

(71) Applicant: Mitsubishi Electric Research Laboratories, Inc., Cambridge, MA (US)

(72) Inventors: Oncel Tuzel, Winchester, MA (US); Ming-Yu Liu, Revere, MA (US); Raviteja Vemulapalli, Hyattsville, MD (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 45 days.

(21) Appl. No.: 14/854,352

(22) Filed: Sep. 15, 2015

(65) Prior Publication Data
US 2017/0076170 A1    Mar. 16, 2017

(51) Int. Cl.
| | | |
|---|---|---|
| *G06K 9/00* | (2006.01) | |
| *G06K 9/40* | (2006.01) | |
| *G06K 9/62* | (2006.01) | |
| *G06N 3/08* | (2006.01) | |
| *G06T 5/00* | (2006.01) | |

(52) U.S. Cl.
CPC .............. *G06K 9/40* (2013.01); *G06K 9/6277* (2013.01); *G06N 3/084* (2013.01); *G06T 5/002* (2013.01)

(58) Field of Classification Search
CPC ........ G06K 9/40; G06K 9/6277; G06N 3/084; G06T 5/002
See application file for complete search history.

(56) References Cited

U.S. PATENT DOCUMENTS

| | | | | |
|---|---|---|---|---|
| 2005/0105804 A1* | 5/2005 | Francos | ............... | G06K 9/6203 382/215 |
| 2007/0183629 A1* | 8/2007 | Porikli | ..................... | G06K 9/32 382/103 |
| 2010/0316293 A1* | 12/2010 | Claussen | ............ | G06K 9/00288 382/170 |
| 2011/0156954 A1* | 6/2011 | Roh | ........................ | G01S 19/22 342/357.69 |

(Continued)

OTHER PUBLICATIONS

Vemulapalli et al. "Deep Gaussian Conditional Random Field Network: A Model-based Deep Network for Discriminative Denoising", Nov. 2015.*

(Continued)

*Primary Examiner* — Aaron W Carter
(74) *Attorney, Agent, or Firm* — Gene Vinokur; James McAleenan; Hironori Tsukamoto

(57) ABSTRACT

A sensor acquires an input image X of a scene. The image includes noise with a variance $\sigma^2$. A deep Gaussian conditional random field (GCRF) network is applied to the input image to produce an output image Y, where the output image is denoised, and wherein the deep GCRF includes a prior generation (PgNet) network followed by an inference network (InfNet), wherein the PgNet produces patch covariance priors $\Sigma_{ij}$ for patches centered on every pixel (i,j) in the input image, and wherein the InfNet is applied to the patch covariance priors and the input image to solve the GCRF.

20 Claims, 5 Drawing Sheets

(56) References Cited

U.S. PATENT DOCUMENTS

| | | | |
|---|---|---|---|
| 2013/0124438 A1* | 5/2013 | Lee | G06N 99/005 706/12 |
| 2013/0163859 A1* | 6/2013 | Nowozin | G06K 9/6219 382/159 |
| 2014/0307950 A1* | 10/2014 | Jancsary | G06T 5/003 382/154 |
| 2015/0003542 A1* | 1/2015 | Barbu | H04L 25/0218 375/260 |
| 2015/0030237 A1* | 1/2015 | Jancsary | G06K 9/6282 382/159 |
| 2015/0131898 A1* | 5/2015 | Schelten | G06T 5/003 382/159 |
| 2015/0215590 A1* | 7/2015 | Nowozin | G06T 3/4015 348/242 |

OTHER PUBLICATIONS

Burger et al., "Image Denoising: Can Plain Neural Networks Compete with BM3D?," CVPR, 2012.

Dabov et al., "Image Denoising by Sparse 3-D Transform-Domain Collaborative Filtering," IEEE Transactions on Image Processing, 16(8)2080-2095, 2007.

M. F. Tappen, C. Liu, E. H. Adelson, and W. T. Freeman. Learning Gaussian Conditional Random Fields for Low-Level Vision. In CVPR, 2007.

Zoran et al., "From Learning Models of Natural Image Patches to Whole Image Restoration," In ICCV, 2011.

\* cited by examiner

METHOD AND SYSTEM FOR DENOISING IMAGES USING DEEP GAUSSIAN CONDITIONAL RANDOM FIELD NETWORK

FIELD OF THE INVENTION

This invention relates generally to computer vision and image processing, and more particularly to denoising images.

BACKGROUND OF THE INVENTION

Deep networks are used in many computer vision and image processing applications. A typical deep network with fully-connected layers or convolutional layers works well for a wide range of applications. However, that general architecture does not use problem domain knowledge, which could be very helpful in some applications.

For example, in the case of image denoising, conventional multilayer perceptrons (feedforward neural networks) are not very good at handling multiple levels of input noise. When a single multilayer perceptron is trained to handle multiple input noise levels, by providing the noise variance as an additional input to the network, it produced inferior results compared to the state-of-the-art Block-matching and 3D filtering (BM3D), see Dabov et al., "Image Denoising by Sparse 3-D Transform-Domain Collaborative Filtering," IEEE Transactions on Image Processing, 16(8):2080-2095, 2007. In contrast to this, an Expected Patch Log Likelihood (EPLL) framework, which is a model-based approach, works well across a wide range of noise levels, see Zoran et al., "From Learning Models of Natural Image Patches to Whole Image Restoration," In ICCV, 2011.

Gaussian Markov Random Fields (GMRFs) are often used in image inference tasks, such as denoising, inpainting, super-resolution, depth estimation. GMRFs model continuous quantities and can be efficiently solved using linear algebra. However, the performance of a GMRF model depends heavily on the choice of a prior probability distribution (prior). For example, in the case of image denoising, a homogeneous prior, i.e., an identical prior for each pixel, results in blurred edges and over-smoothing of the images. Hence, to successfully use the GMRF model, the prior should be selected according to the image being processed. A GMRF model that uses a data-dependent prior is referred to as Gaussian conditional random field (GCRF).

Using GCRF model for an image inference task involves two main steps:
1) a data-dependent prior generation step in which an appropriate image prior is selected based on the input image; and
2) an inference step in which a Maximum a Posteriori (MAP) inference is performed with the selected image prior.

Gaussian Conditional Random Fields:

The GCRF model described by Tappen et al., see "Learning Gaussian Conditional Random Fields for Low-Level Vision," CVPR, 2007, models the parameters of a conditional distribution of the output image as a function of the input image. A precision matrix associated with each image patch, e.g., 3×3 pixels, is modeled as a linear combination of hand-selected derivative filter-based matrices. The combination weights are selected as a parametric function of the absolute responses of the input image to a set of predefined multi-scale oriented edge and bar filters, and the parameters are learned using discriminative training.

The GCRF model has been extended to Regression Tree Fields (RTFs), see Jancsary et al., "Loss-specific Training of Non-parametric Image Restoration Models: A New State of the Art," ECCV, 2012, where regression trees are used for parameter selection. A full-image model is decomposed into several overlapping patch models, and the regression trees are constructed for selecting parameters of the Gaussian models defined over the patches. The regression trees use responses of input image to various hand-chosen filters for selecting an appropriate leaf node for each image patch. More recently, a cascade of RTFs has been used for non-blind image deblurring, see Schmidt et al., "Discriminative Non-blind Deblurring," CVPR, 2013.

Denoising

Image denoising is a fundamental problem in image processing. There are many methods that can be used for denoising, including shrinkage, sparse coding with non-local image statistics, natural image priors, and graphical models.

Denoising with Neural Networks:

Various deep network based approaches are known for image denoising, such as stacked sparse denoising autoencoders (SSDA), and multilayer perceptrons, see Burger et al., "Image Denoising: Can Plain Neural Networks Compete with BM3D?" CVPR, 2012. However, none of those deep networks explicitly model the variance of the noise, and hence are not good at handling multiple noise levels. In all the above networks, a different network is used for each noise level, which complicates the design and process.

SUMMARY OF THE INVENTION

The embodiments of the invention provide a method and system for denoising images. The method uses a deep network based on a Gaussian conditional random field model (deep GCRF). The deep GCRF network includes two sub-networks: a data-dependent prior generation network (PgNet), and an inference network (infNet). The prior generation network is used to model image-specific priors. Layers of the inference network replicate steps of an iterative GCRF inference procedure. The deep GCRF network is trained via back-propagation using a loss function specific for image denoising.

Conventional discriminative denoising models typically require separate networks for each noise level. In contrast, the deep network according to the embodiments explicitly models the input noise variance, and hence generalizes for different noise levels.

The deep GCRF network converts the prior generation and inference steps of the GCRF into feed-forward networks. With such a deep network architecture, it is possible to learn good data-dependent priors for inference tasks such as denoising, inpainting, super-resolution, depth estimation, etc., by discriminatively training the deep network using back-propagation.

This GCRF network architecture is different from conventional deep neural networks, e.g., networks with convolutional and fully connected layers. While the parameters of the conventional neural networks are linear filters, the network according to the embodiments uses symmetric positive semidefinite matrices as model parameters. The network according to the embodiments has various novel types of layers that use quadratic functions, matrix inversions and multiplicative interactions, which are different from conventional computations that use linear filters followed by non-linearity. This results in a number of benefits:

Most of the prior art discriminative image denoising methods cannot handle multiple noise levels because those methods do not use input noise variance in their model. In contrast to this, the embodiments explicitly model the input noise variance in the GCRF model, and provide the noise variance as an input to the network. Hence, the deep GCRF network can handle multiple noise levels.

Unlike many conventional GCRF approaches, the disclosed deep GCRF network does not use any manually chosen image features or filters. The deep GCRF network is trained end-to-end with conventional back-propagation using a loss function specific for image denoising task. Instead of solving very large linear systems as in prior art GCRFs, the disclosed network uses half quadratic splitting (HQS) layers. Hence, all the computations in in network can be fully parallelized at the pixel level.

DETAILED DESCRIPTION OF THE PREFERRED EMBODIMENTS

The embodiments of our invention provide a method and system for denoising images. The method uses a deep Gaussian conditional random field (GCRF) network 105. The input to the deep GCRF is a noisy input image 101 and a variance $\sigma^2$ 102 of noise. The method can be performed in a processor 100 connected to memory, input/output interfaces. The processor acquires the image either directly or indirectly. For example, the image is captured by a camera, and then transferred to the processor by a memory, or a wired or wireless communication link.

Figure 1A:
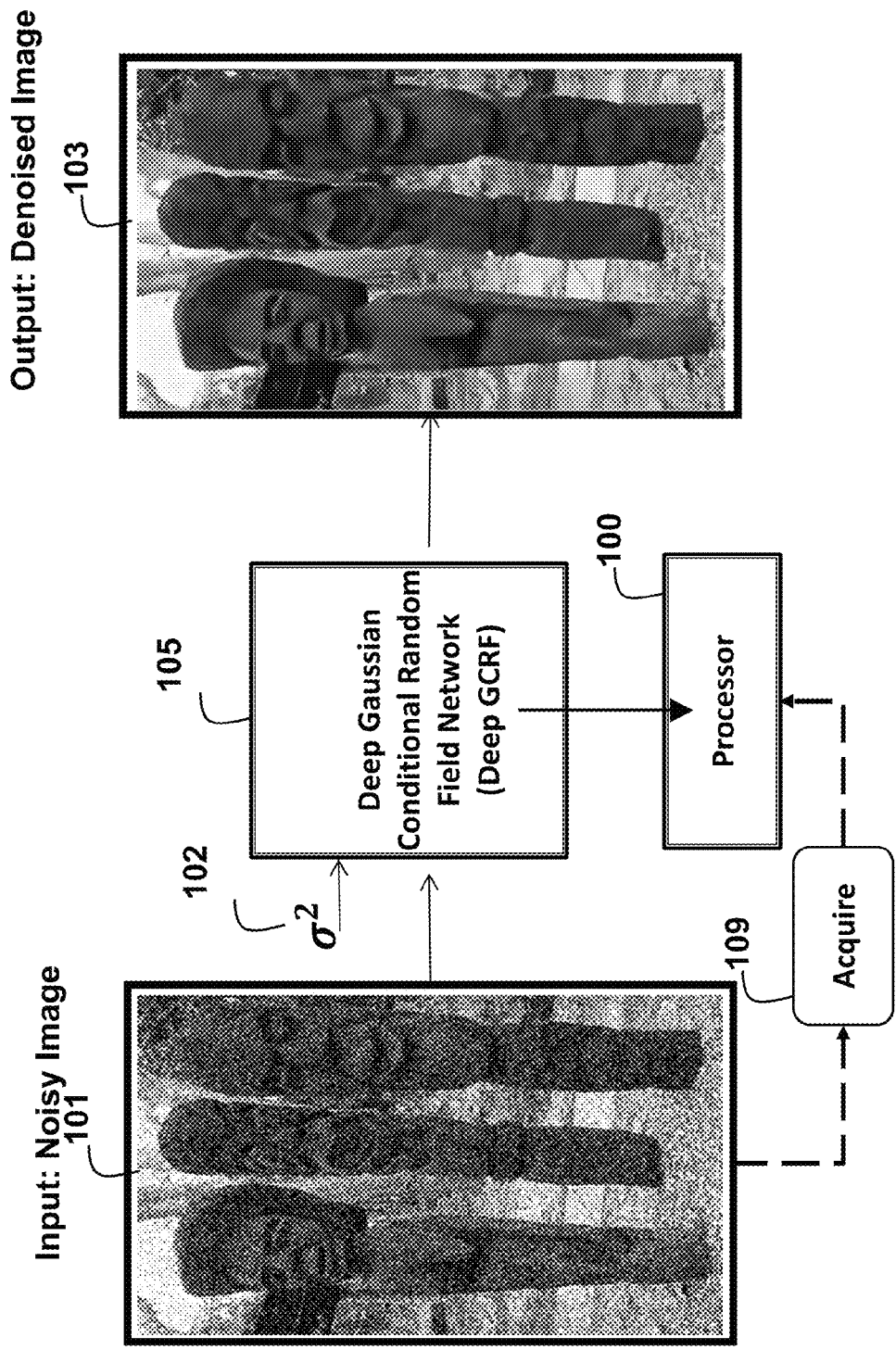
FIG. 1A is a schematic of image denoising using a deep Gaussian conditional random field (deep GCRF) network according to embodiments of the invention.

As shown in FIG. 1A, the input image 101 is captured, e.g., a camera or a depth sensor. Then, concurrently or later, the image is acquired 109 by the processor. The image includes noise with the variance $\sigma^2$ 102. The noise variance can be determined using conventional techniques. It is desired to denoise the image 101 to produce a denoised output image 103. Therefore, the image 101 is processed by the deep Gaussian conditional random field network (deep GCRF) 105 to produce the output image 103, which can be stored, transmitted, displayed or printed.

Notation

Bold face capital letters denote matrices, bold face small letters denote vectors, vec(A), $A^T$ and $A^{-1}$ denote the column vector representation, transpose and inverse of a matrix A, respectively, and $A \geq 0$ means the matrix A is symmetric and positive semidefinite.

Gaussian Conditional Random Field

Figure 1B:
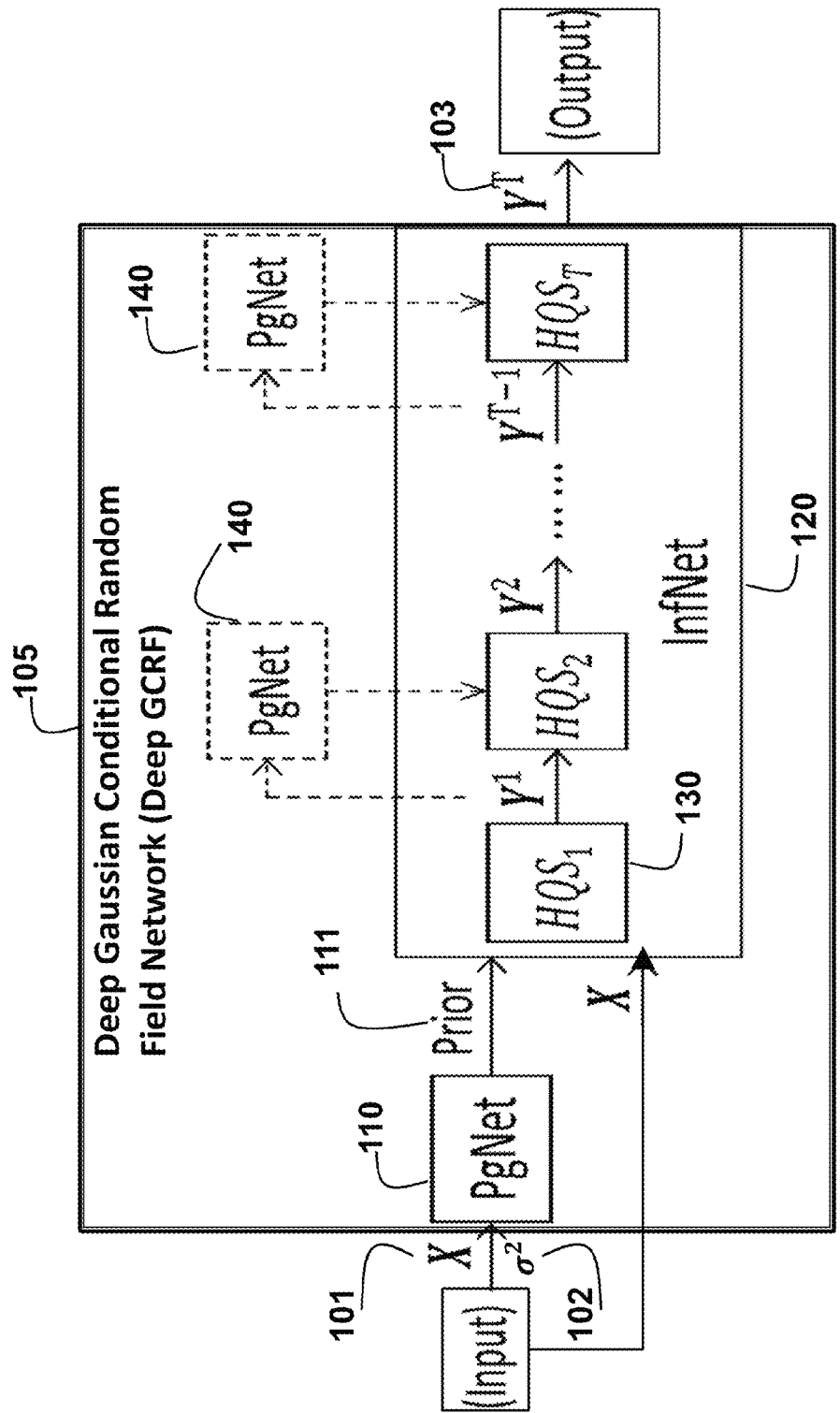
FIG. 1B is a block diagram of the deep GCRF network according to embodiments of the invention.

In the following and as shown in FIG. 1B, X represents the noisy input image 101, $\sigma^2$ 102 is the variance of the noise in the input image 101, and Y represents the denoised output image 103, with pixels X(i,j) and Y(i,j), respectively.

We model the conditional probability p(Y|X) as a Gaussian distribution $$p(Y|X) \propto \exp\left(-\frac{1}{2\sigma^2}\sum_{i,j}[Y(i,j)-X(i,j)]^2 - \frac{1}{2}vec(Y)^T Qvec(Y)\right). \quad (1)$$

The left term in the exponent (exp) is a data term, and the right term in the exponent is a data-dependent prior term. The quadratic prior parameters $Q \geq 0$ are selected based on the input image X 101. The output image Y 103 is inferred by maximizing the conditional probability p(Y|X).

Generating an Image Prior Using Patch Priors

Directly selecting the prior parameters Q for an entire image is difficult because the number of pixels in an image could be of the order of $10^6$ or greater. Hence, we construct a full-image prior Q indirectly by using priors on image patches of d×d pixels each.

Let $x_{ij}$ and $y_{ij}$ be $d^2 \times 1$ column vectors representing the d×d patches centered on pixel (i,j) in images X and Y, respectively. The patches can be 3×3, 5×5, etc. Let $\bar{x}_{ij}=Gx_{ij}$ and $\bar{y}_{ij}=Gy_{ij}$ be mean-subtracted versions of $x_{ij}$ and $y_{ij}$, respectively, where $$G = \left(I - \frac{1}{d^2}11^T\right)$$

is a mean subtraction matrix. Here, I is a $d^2 \times d^2$ identity matrix, 1 is a $d^2 \times 1$ vector of ones, and T is the transpose operator.

Let $p(\bar{y}_{ij}) \sim \mathcal{N}(0, \Sigma_{ij})$ be a data-dependent zero-mean Gaussian prior on the patch $\bar{y}_{ij}$. Combining the patch priors at all the pixels, we obtain the following full-image prior Q:

$$\prod_{i,j} p(\bar{y}_{ij}) \propto \exp\left(-\frac{1}{2}\sum_{i,j}\bar{y}_{ij}^T \Sigma_{ij}^{-1} \bar{y}_{ij}\right) = \exp\left(-\frac{1}{2}vec(Y)^T Qvec(Y)\right). \quad (2)$$

wherein vec is a linear transformation that converts a matrix into a column vector.

Because we use all d×d image patches, each pixel appears in $d^2$ patches that are centered on its d×d neighbors. In every patch, each pixel interacts with all the $d^2$ pixels in that patch through the covariance priors $\Sigma_{ij}$. This effectively defines a graphical model on the entire output image Y with a neighborhood size of (2d−1)×(2d−1).

Inference

Given the covariance priors $\Sigma_{ij}$, the GCRF inference solves the following optimization problem:

$$1) \quad Y^* = \underset{Y}{\operatorname{argmax}} \log(p(Y|X)) \quad (3)$$

$$2) \quad = \underset{Y}{\operatorname{argmin}} \sum_{i,j}\left(\frac{1}{\sigma^2}[Y(i,j)-X(i,j)]^2 + y_{ij}^T G^T \Sigma_{ij}^{-1} G y_{ij}\right).$$

The optimization problem in Eq. (3) is an unconstrained quadratic program that could be solved exactly in a closed form. However, the closed form solution for the output image Y requires solving a linear system of equations with number of variables equal to the number of image pixels. Because solving such linear systems is computationally prohibitive for large images with millions of pixels, we use an iterative optimization method called half quadratic splitting (HQS), that can solve the above optimization problem. This approach enables efficient optimization by using auxiliary variables, see Zoran et al., "From Learning Models of Natural Image Patches to Whole Image Restoration," ICCV, 2011.

Let $z_{ij}$ be an auxiliary variable corresponding to the patch $y_{ij}$. In the half quadratic splitting method, the cost function in Eq. (3) is modified to $$J(Y, \{z_{ij}\}, \beta) = \sum_{i,j} \left( \frac{1}{\sigma^2}[Y(i,j) - X(i,j)]^2 + \beta\|y_{ij} - z_{ij}\|_2^2 + z_{ij}^T G^T \Sigma_{ij}^{-1} G z_{ij} \right), \quad (4)$$

and J is minimized while increasing β in each iteration. Note that as $\beta \to \infty$, the patches $\{y_{ij}\}$ are restricted to be equal to the auxiliary variables $\{z_{ij}\}$, and the solutions of Equations (3) and Error! Reference source not found. converge.

For a fixed value of β, the cost function J can be minimized by alternatively optimizing for Y and $\{z_{ij}\}$. If we fix Y, then the optimal $z_{ij}$ is $$f_{ij}(Y) = \operatorname*{argmin}_{z_{ij}}(\beta\|y_{ij} - z_{ij}\|_2^2 + z_{ij}^T G^T \Sigma_{ij}^{-1} G z_{ij}) \quad (5)$$

$$= (G^T \Sigma_{ij}^{-1} G + \beta I)^{-1} \beta y_{ij} = (I - G^T(\beta \Sigma_{ij} + G G^T)^{-1} G) y_{ij}.$$

The last equality in the above equation follows from Woodbury matrix identity. If we fix $\{z_{ij}\}$, then the optimal Y(i,j) is $$g_{ij}(\{z_{i,j}\}) = \operatorname*{argmin}_{Y(i,j)} \left( \frac{1}{\sigma^2}[Y(i,j) - X(i,j)]^2 + \beta \sum_{p,q=-\lfloor\frac{d-1}{2}\rfloor}^{\lceil\frac{d-1}{2}\rceil} [Y(i,j) - z_{pq}(i,j)]^2 \right)$$

$$= \frac{X(i,j) + \beta\sigma^2 \sum_{p,q=-\lfloor\frac{d-1}{2}\rfloor}^{\lceil\frac{d-1}{2}\rceil} z_{pq}(i,j)}{(1 + \beta\sigma^2 d^2)}, \quad (6)$$

where ⌊ ⌋ and ⌈ ⌉ are floor and ceiling operators, respectively, and $z_{pq}(i,j)$ is the intensity of pixel (i,j) according to the auxiliary patch $z_{pq}$.

Deep GCRF Network

As described above and shown in FIG. 1B, the deep GCRF network 105 according to embodiments includes the following components.

Prior Generation Network (PgNet) 110

The PgNet generates patch covariance priors $\Sigma_{ij}$ 111 using the input image X 101.

Inference Network (InfNet) 120

The InfNet performs GCRF inference using the patch covariance priors $\Sigma_{ij}$ 111 from the PgNet 110. The InfNet includes a set of half quadratic splitting (HQS) layers 130 connected in series. 14. In some embodiments, instead of using HQS layers, the InfNet can perform Gaussian Conditional Random Field inference as in Eqn. (3) by directly solving a linear system.

By combining the PgNet and InfNet, we obtain our deep GCRF network. Note that selecting an appropriate prior is very important for the success of GCRF. Because the PgNet operates on the noisy input image 101, it becomes increasingly difficult to select a good prior as the image noise increases. To address this issue, we use an additional PgNet 140 after each HQS iteration 130 as shown in dotted boxes in FIG. 1B.

Because we discriminatively train our deep GCRF network end-to-end using back-propagation, even when the first PgNet 110 fails to select a good prior, the later PgNets 140 can learn to select appropriate priors based on partially restored images.

Prior Generation Network (PgNet)

Figure 3:
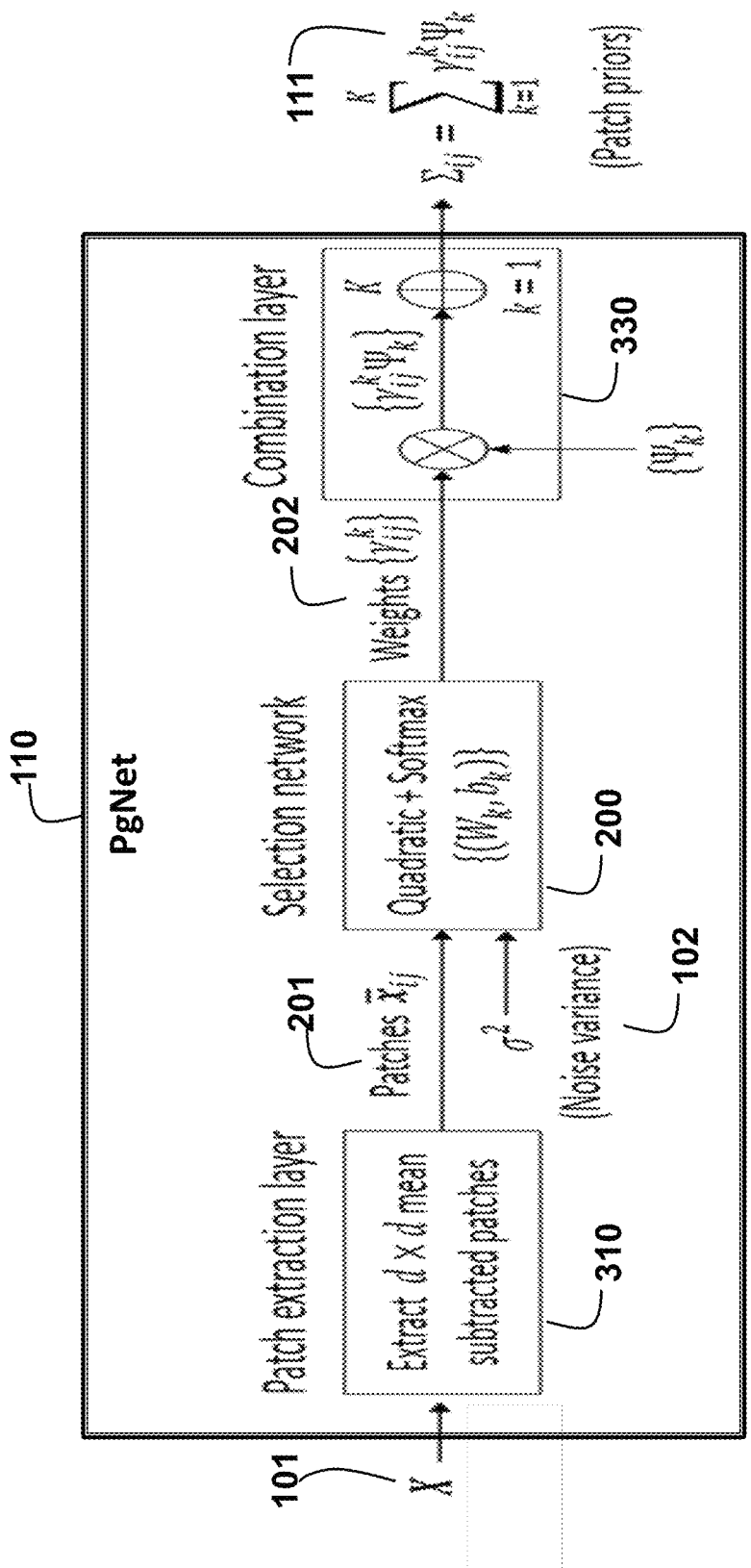
FIG. 3 is a block diagram of a prior generation network (PgNet) according to embodiments of the invention.

FIG. 3 shows the prior generation network (PgNet) 110. The PgNet generates the patch covariance priors $\Sigma_{ij}$ 111 for all of the patches in the image, where (i,j) is the center pixel of a patch. The PgNet includes a patch extraction layer 310, a selection network 200, and a combination layer 330.

Given the input image X 101, the patch extraction layer 310 extracts d×d dimensional mean subtracted patches centered on every pixel (i,j) of the image. Let $x_{ij}$ and be $d^2 \times 1$ column vector representing the d×d patch centered on pixel (i,j) in image X. The patch extraction layer determines $\bar{x}_{ij} = G x_{ij}$ which is a mean-subtracted version of $x_{ij}$, where $$G = \left(I - \frac{1}{d^2}11^T\right)$$

is a mean subtraction matrix.

Figure 2:
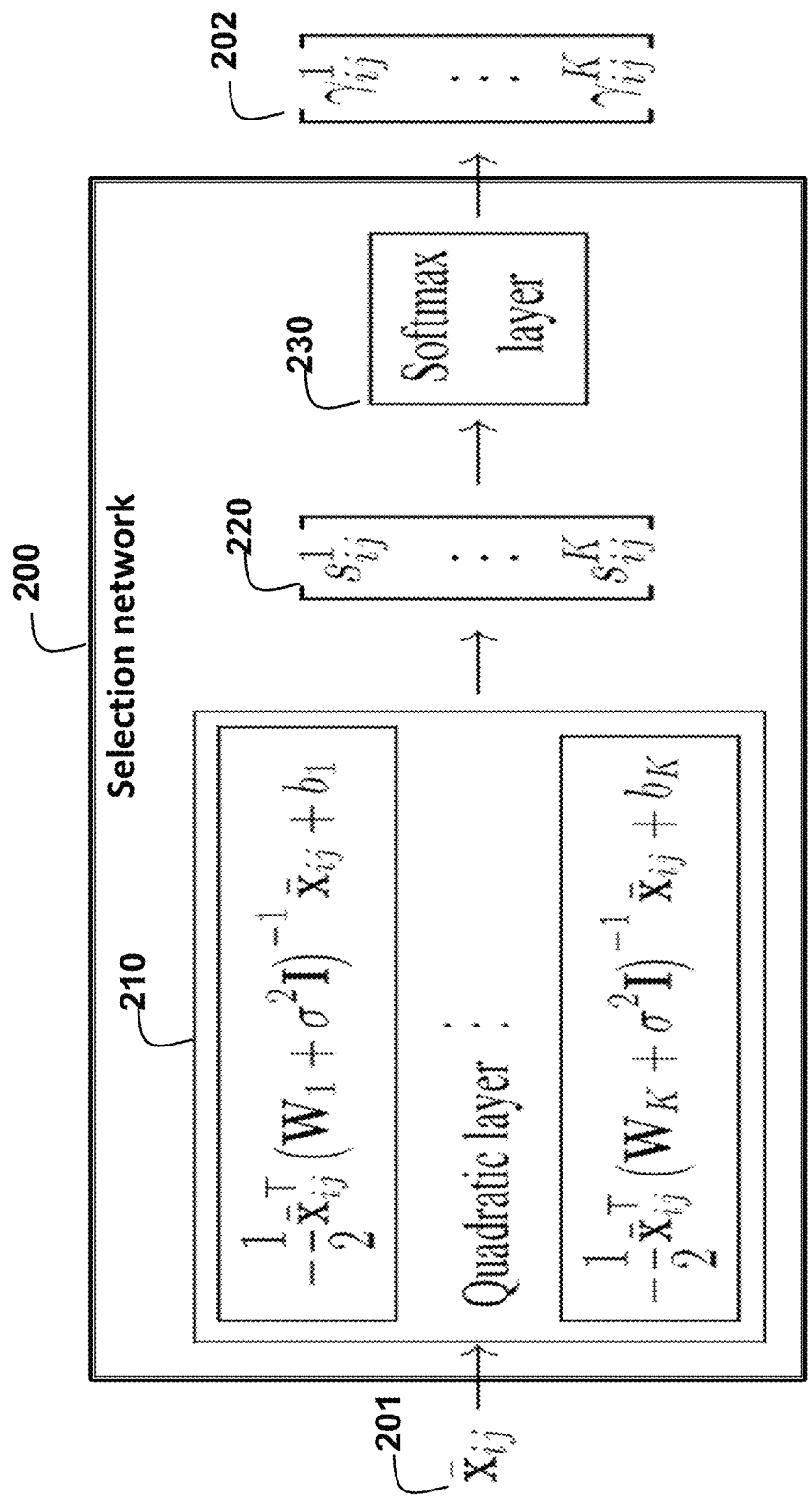
FIG. 2 is a block diagram of a two layer selection network according to embodiments of the invention.

The input to selection network are the mean subtracted patches $\bar{x}_{ij}$ 201 and the noise variance $\sigma^2$ 102. We use a two layer selection network 200, as shown in FIG. 2 to select combination weights $\{\gamma_{ij}^k\}$ 202. Mean subtracted patches $\bar{x}_{ij}$ 201, extracted from the input image X 101, are used to determine the combination weights $\{\gamma_{ij}^k\}$ 202. The parameters of selection network $\{(W_k \succeq 0, b_k)\}$ are used in the quadratic layer 210. The selection network includes a quadratic layer 210 to produce $$s_{ij}^k = -\frac{1}{2}\bar{x}_{ij}^T(W_k + \sigma^2 I)^{-1}\bar{x}_{ij} + b_k, \quad (7)$$

which are component log-likelihoods 220 (log-likelihood of selecting $k^{th}$ component for the patch centered at $(i,j)^{th}$ pixel). This is followed by a Softmax layer which determines combination weights $\gamma_{ij}$=SoftMax($s_{ij}$) 230, wherein SoftMax is softmax function or normalized exponential.

The combination layer 330 selects the patch covariance prior as a convex combination of K symmetric positive semidefinite matrices $\Psi_1, \ldots, \Psi_K$, i.e., $$\Sigma_{ij} = \Sigma_k \gamma_{ij}^k \Psi_k, \gamma_{ij}^k \geq 0, \Sigma_k \gamma_{ij}^k = 1$$

We select the particular quadratic form $(W_k + \sigma^2 I)^{-1}$ in the selection network 200 so that we can interpret the computation of component log-likelihoods $\{s^k\}$ 220 as evaluating Gaussian log likelihoods. If we interpret $\{W_k\}$ as covariance matrices associated with the clean patches, then $\{W_k + \sigma^2 I\}$ can be interpreted as covariance matrices associated with the noisy patches.

The benefits of this quadratic form are twofold:
(i) the selector is symmetric. Because we are selecting zero-mean Gaussian priors, if a patch $\bar{x}$ is likely to have a particular covariance prior, then the patch $-\bar{x}$ is also equally likely to have the same covariance prior. Our selector satisfies that both x̄ and −x̄ having the same combination weights $\{\gamma^k\}$; and (ii) our selection is robust to input image noise because the quadratic form accounts for the noise variance $\sigma^2$.

Inference Network

Figure 4:
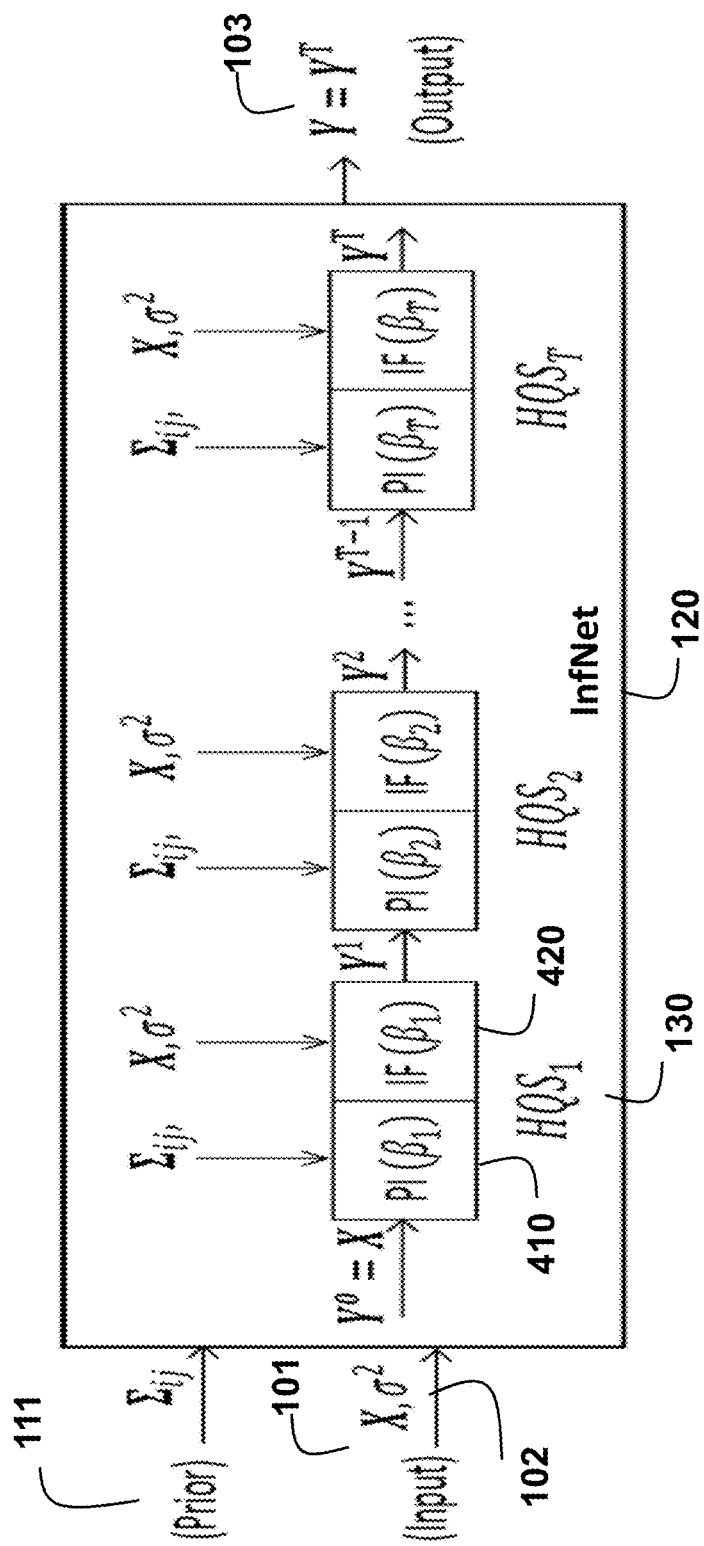
FIG. 4 is a block diagram of an inference network (InfNet) according to embodiments of the invention.

We use the half quadratic splitting method described above to design our inference network. Each layer of the inference network, also referred to as a HQS layer, implements one half quadratic splitting iteration (Eq. 5 and 6). Each HQS layer has the following two sequential sub-layers as shown in FIG. 4.

Patch Inference Layer (PI) 410

This layer takes the current estimate of the output $Y^t$ as input, and determines the auxiliary patches $\{z_{ij}\}$ using $f_{ij}(Y)$.

Image Formation Layer (IF) 420

This layer takes the auxiliary patches $\{z_{ij}\}$ given by the PI layer as input, and determines next image estimate $Y^{t+1}$ using $g_{ij}(\{z_{ij}\})$.

If the set of β constants for half quadratic splitting is $\{\beta_1, \beta_2, \ldots, \beta_T\}$, then, our inference network has T HQS layers 130 as shown in FIG. 4. Here, $\Sigma_{ij}$ are the patch covariances priors determined by the PgNet 110 for the input image X 101 with the noise variance $\sigma^2$ 102.

Deep GCRF Network

Combining the above prior generation and inference networks, we obtain our deep GCRF network with parameters $\{(W_k \geq 0, b_k, \Psi_k \geq 0)\}$. Note that our network has various new types of layers that use quadratic functions, matrix inversions and multiplicative interactions, which are different from the computations used in conventional deep networks.

Generating Prior after Each Iteration

Note that selecting an appropriate prior is crucial for the success of GCRF. Because the prior generation network operates on the input image X, it is very difficult to select a good prior at high noise levels, even after incorporating the noise variance $\sigma^2$ into the selection network 200. To overcome this issue, we use the additional PgNets 140 after each HQS iteration 130. The rationale for adding these additional PgNets is that even if the first PgNet 110 fails to select a good prior 111, the later PgNets can select appropriate priors using partially denoised images.

Training

In the preferred embodiment, we train our deep GCRF network discriminatively using a mean squared error (MSE) loss function applied to a dataset of pairs of noisy training images and denoised training images. In some other embodiments, the deep GCRF network is trained by maximizing peak signal to noise ratio (PSNR) or structural similarity measure (SSIM). The noisy training images can be generated by adding synthetic noise to noise free images.

We use conventional back-propagation to determine derivatives of the loss with respect to the network parameters. Note that we have a constrained optimization problem here because our parameters $\{(W_k \geq 0, \Psi_k \geq 0)\}$ need to be symmetric and positive semidefinite. We convert this constrained problem into an unconstrained problem by parametrizing $W_k = P_k P_k^T$ and $\Psi_k = R_k R_k^T$, where $P_k$ and $R_k$ are lower triangular matrices, and use limited memory Broyden-Fletcher-Goldfarb-Shanno (BFGS) algorithm for optimization.

EFFECT OF THE INVENTION

The embodiments of the invention provide a novel deep network architecture for image denoising based on a deep Gaussian convolutional random field (GRCF). Prior generation and inference steps of the deep GCRF network are converted to feed-forward networks. The deep GCRF network can handle multiple noise levels because the network explicitly models the noise variance. When discriminatively trained, the network outperformed various state-of-the-art image denoising methods.

The deep GCRF network can be used for a number of computer vision applications, including, but not limited to inpainting, image super-resolution and depth estimation.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for denoising an image, comprising steps of:
acquiring an input image X, wherein the input image includes noise with a variance $\sigma^2$; and
applying a deep Gaussian conditional random field (GCRF) network to the input image to produce an output image Y, where the output image is denoised, and wherein the deep GCRF includes a prior generation (PgNet) network followed by an inference network (InfNet), wherein the PgNet produces patch covariance priors $\Sigma_{ij}$ for patches centered on every pixel (i,j) in the input image, and wherein the InfNet is applied to the patch covariance priors and the input image to solve the GCRF, wherein the applying is performed in a processor.

2. The method of claim 1, wherein the PgNet includes a patch extraction layer, a selection network, and a combination layer.

3. The method of claim 2, wherein the patch extraction layer determines d×d dimensional mean-subtracted patches $\bar{x}_{ij}$ centered on every pixel (i,j) of the image wherein $\bar{x}_{ij} = G x_{ij}$, wherein $x_{ij}$ is a $d^2 \times 1$ column vector representing the d×d patch centered on pixel (i,j), $$G = \left(I - \frac{1}{d^2} 1 1^T\right)$$

is the mean subtraction matrix, I is a $d^2 \times d^2$ identity matrix, and 1 is a $d^2 \times 1$ vector of ones, and T is a transpose operator.

4. The method of claim 2, wherein the selection network determines combination weights for each patch as $\gamma_{ij} = \text{SoftMax}(s_{ij})$, wherein $s_{ij}$ are component log-likelihoods which are determined by a quadratic function $$s_{ij}^k = -\frac{1}{2} \bar{x}_{ij}^T (W_k + \sigma^2 I)^{-1} \bar{x}_{ij} + b_k,$$

wherein $\{(W_k \geq 0, b_k)\}$ are parameters of the selection network, SoftMax is a softmax function, and $\geq 0$ indicates a symmetric and positive semidefinite matrix.

5. The method of claim 4, wherein the combination layer determines the patch covariance priors as a convex combination of K symmetric positive semidefinite matrices $\Psi_1, \ldots, \Psi_K$, $$\Sigma_{ij} = \Sigma_k \gamma_{ij}^k \Psi_k, \gamma_{ij}^k \geq 0, \Sigma_k \gamma_{ij}^k = 1,$$

wherein $\gamma_{ij}^k$ are the combination weights.

6. The method of claim 1, wherein the InfNet is an inference procedure which solves the GCRF, $$Y^* = \underset{Y}{\operatorname{argmin}} \sum_{i,j} \left( \frac{1}{\sigma^2} [Y(i,j) - X(i,j)]^2 + y_{ij}^T G^T \Sigma_{ij}^{-1} G y_{ij} \right),$$

wherein $$G = \left( I - \frac{1}{d^2} 1 1^T \right)$$

is a mean subtraction matrix, I is a $d^2 \times d^2$ identity matrix, 1 is a $d^2 \times 1$ vector of ones, and T is a transpose operator.

7. The method of claim 1, wherein the InfNet is an iterative procedure including a set of one or more half quadratic splitting (HQS) layers connected sequentially.

8. The method of claim 7, wherein each HQS splitting layer includes a patch inference (PI) layer followed by an image formation (IF) layer.

9. The method of claim 8 wherein patch inference layer determines auxilary patches $z_{ij} = f_{ij}(Y)$ wherein $$f_{ij}(Y) = \underset{z_{ij}}{\operatorname{argmin}} (\beta \|y_{ij} - z_{ij}\|_2^2 + z_{ij}^T G^T \Sigma_{ij}^{-1} G z_{ij})$$
$$= (G^T \Sigma_{ij}^{-1} G + \beta I)^{-1} \beta y_{ij} = (I - G^T (\beta \Sigma_{ij} + G G^T)^{-1} G) y_{ij}.$$

wherein $$G = \left( I - \frac{1}{d^2} 1 1^T \right)$$

is a mean subtraction matrix, I is a $d^2 \times d^2$ identity matrix, 1 is a $d^2 \times 1$ vector of ones, T is a transpose operator, and $\beta$ is a constant.

10. The method of claim 8 wherein the image formation layer determines next denoised image estimate $Y^{t+1} = g_{ij}(\{z_{ij}\})$ wherein $$g_{ij}(\{z_{i,j}\}) = \underset{Y(i,j)}{\operatorname{argmin}} \left( \frac{1}{\sigma^2} [Y(i,j) - X(i,j)]^2 + \beta \sum_{p,q=-\lfloor \frac{d-1}{2} \rfloor}^{\lceil \frac{d-1}{2} \rceil} [Y(i,j) - z_{pq}(i,j)]^2 \right)$$

$$= \frac{\left( X(i,j) + \beta \sigma^2 \sum_{p,q=-\lfloor \frac{d-1}{2} \rfloor}^{\lceil \frac{d-1}{2} \rceil} z_{pq}(i,j) \right)}{(1 + \beta \sigma^2 d^2)}$$

wherein $\lfloor \ \rfloor$ and $\lceil \ \rceil$ are floor and ceiling operators, respectively, and $z_{pq}(i,j)$ is an intensity of pixel (i,j) according to the auxiliary patch $z_{pq}$.

11. The method of claim 7, an output of each HQS layer is processed by an additional PgNet to produce updated patch covariance priors $\Sigma_{ij}$ for a next HQS layer.

12. The method of claim 1, wherein parameters of the deep GCRF are learned using backpropagation and minimizing a mean squared error loss function using a dataset of pairs of noisy training images and noise free training images.

13. The method of claim 12, wherein noisy training images are generated by adding synthetic noise to noise free images.

14. The method of claim 6, wherein InfNet solves a linear system to perform GCRF inference.

15. The method of claim 1, wherein the deep GCRF network is used for image inpainting.

16. The method of claim 1, wherein the deep GCRF network is used for image super-resolution.

17. The method of claim 1, wherein the deep GCRF network is used for depth estimation.

18. The method of claim 12, wherein the parameters of the deep GCRF are learned by maximizing peak signal to noise ratio.

19. The method of claim 12, wherein the parameters of the deep GCRF are learned by maximizing structural similarity measure.

20. A system for denoising an image, comprising:
a sensor for acquiring an input image X of a scene, wherein the input image includes noise with a variance $\sigma^2$; and
a processor for applying a deep Gaussian conditional random field (GCRF) network to the input image to produce an output image Y, where the output image is denoised, and wherein the deep GCRF includes a prior generation (PgNet) network followed by an inference network (InfNet), wherein the PgNet produces patch covariance priors $\Sigma_{ij}$ for patches centered on every pixel (i,j) in the input image, and wherein the InfNet is applied to the patch covariance priors and the input image to solve the GCRF.

* * * * *